United States Patent
Naito

(10) Patent No.: US 9,609,316 B2
(45) Date of Patent: Mar. 28, 2017

(54) IMAGE CODING APPARATUS, IMAGE CODING METHOD, AND RECORDING MEDIUM THEREOF, IMAGE DECODING APPARATUS, AND IMAGE DECODING METHOD, AND RECORDING MEDIUM THEREOF

(71) Applicant: CANON KABUSHIKI KAISHA, Tokyo (JP)

(72) Inventor: Satoshi Naito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 462 days.

(21) Appl. No.: 14/076,019

(22) Filed: Nov. 8, 2013

(65) Prior Publication Data

US 2014/0133581 A1 May 15, 2014

(30) Foreign Application Priority Data

Nov. 12, 2012 (JP) ................................. 2012-248312

(51) Int. Cl.
| | |
|---|---|
| H04N 19/174 | (2014.01) |
| H04N 19/13 | (2014.01) |
| H04N 19/136 | (2014.01) |
| H04N 19/436 | (2014.01) |

(52) U.S. Cl.
CPC ....... H04N 19/00272 (2013.01); H04N 19/13 (2014.11); H04N 19/136 (2014.11); H04N 19/174 (2014.11); H04N 19/436 (2014.11)

(58) Field of Classification Search
CPC ............................ H04N 19/174; H04N 19/436
See application file for complete search history.

(56) References Cited

U.S. PATENT DOCUMENTS

| | | | | |
|---|---|---|---|---|
| 2012/0044987 A1* | 2/2012 | Bennett | .................. | G09G 3/003 375/240.02 |
| 2013/0003858 A1* | 1/2013 | Sze | ........................ | H04N 19/50 375/240.18 |

FOREIGN PATENT DOCUMENTS

| | | |
|---|---|---|
| JP | 2003-244699 A | 8/2003 |
| WO | 2011/004577 A1 | 1/2011 |
| WO | 2011/052142 A1 | 5/2011 |

OTHER PUBLICATIONS

JCTVC-F274; Wavefront Parallel Processing for HEVC Encoding and Decoding; internet <http://phenix.int-evry.fr/jct/doc_end_user/documents/6_Torino/wg11/>, pp. 3-4 (section 4: Wavefront Parallel Processing (proposal)), Jul. 2011.

JCTVC-H1003, High efficiency video coding (HEVC) text specification draft 6; internet <http://phenix.int-evry.fr/jct/doc_end_user/documents/8_San%20Jose/wg11/>, p. 176 (section 9.2.1.3), Nov. 2011.

ITU-T H.264 (Mar. 2010) Advanced video coding for generic audiovisual services.

* cited by examiner

*Primary Examiner* — William C Vaughn, Jr.
*Assistant Examiner* — Jerry Jean Baptiste
(74) *Attorney, Agent, or Firm* — Canon USA, Inc. I.P. Division

(57) ABSTRACT

To prevent deterioration in performance that is caused by the processing for copying a context parameter between memories, an image processing apparatus writes an updated context parameter into context memories corresponding to respective entropy coding units and into a shared context memory, until it completes encoding processing for M blocks positioned on the left side of a slice.

10 Claims, 17 Drawing Sheets

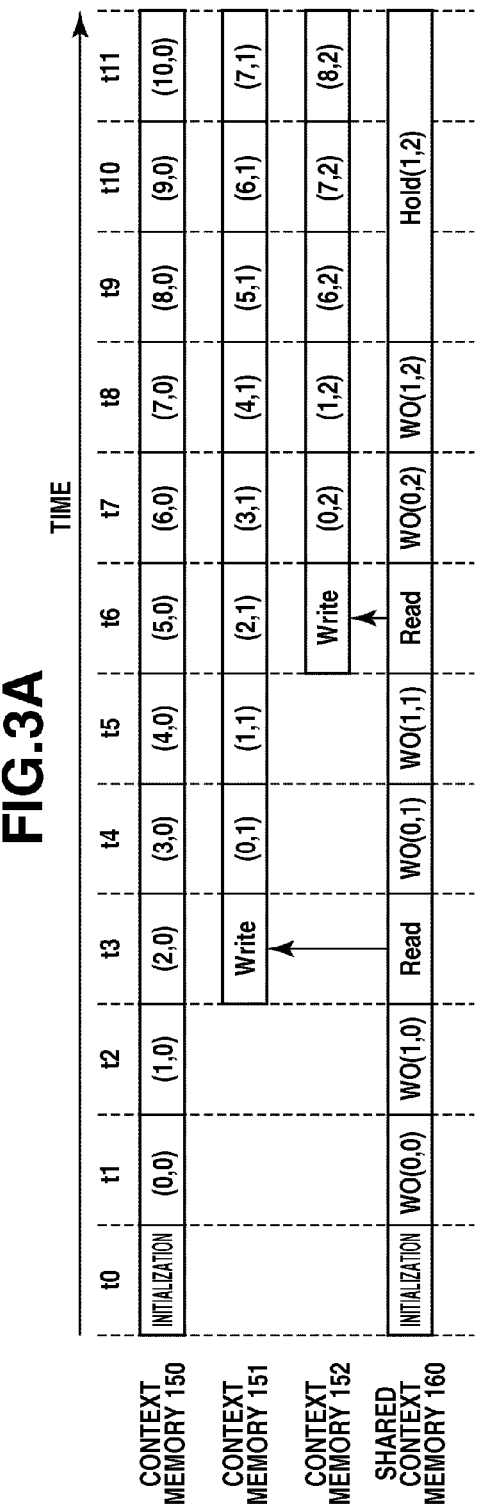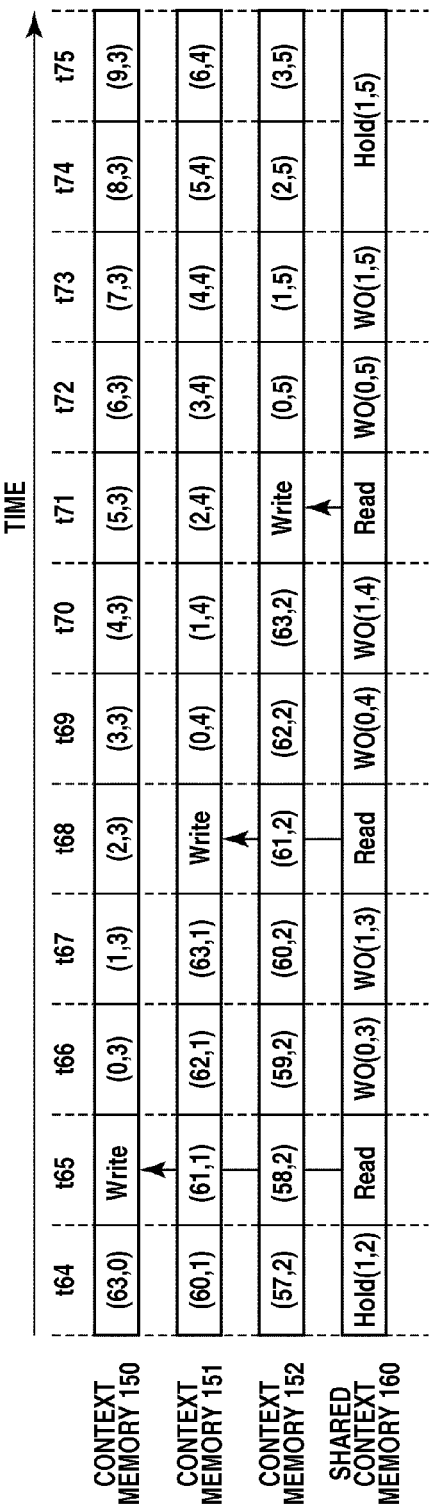

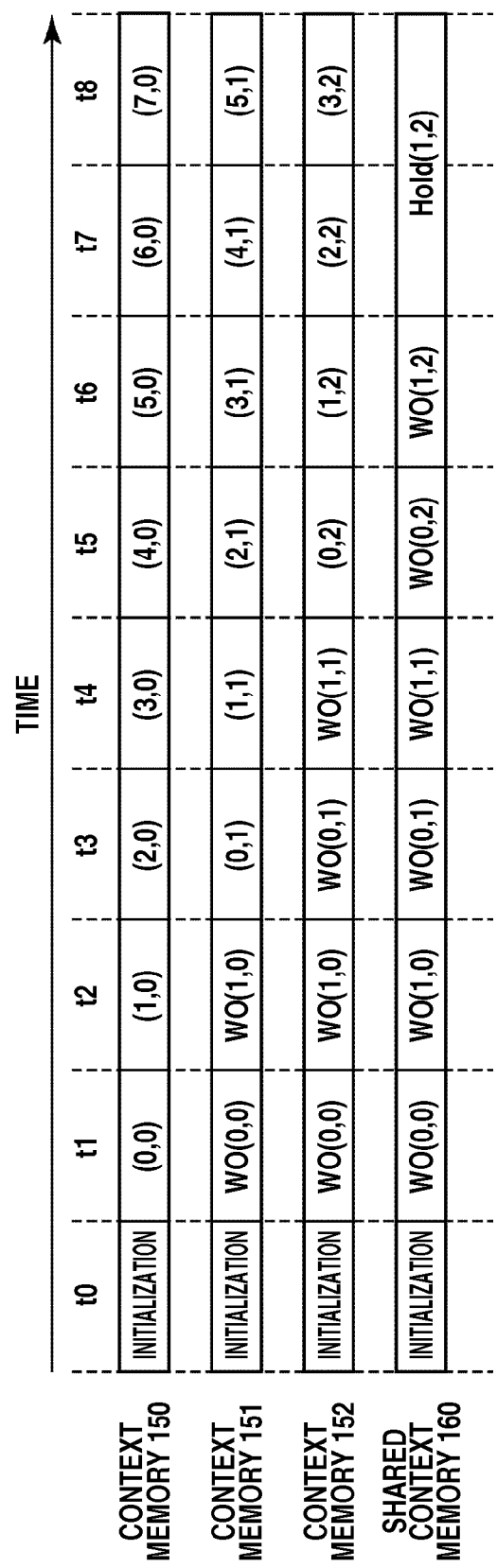

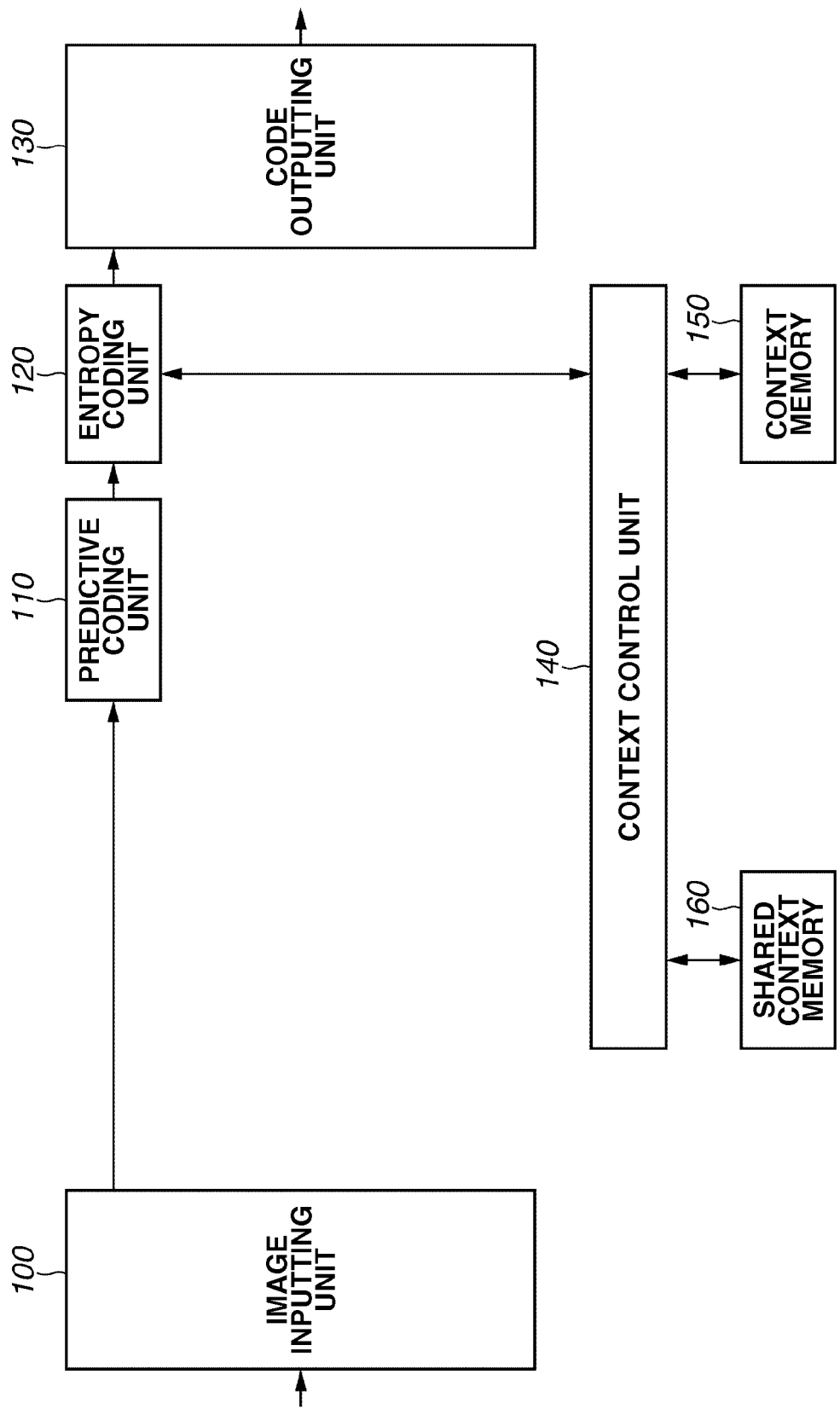

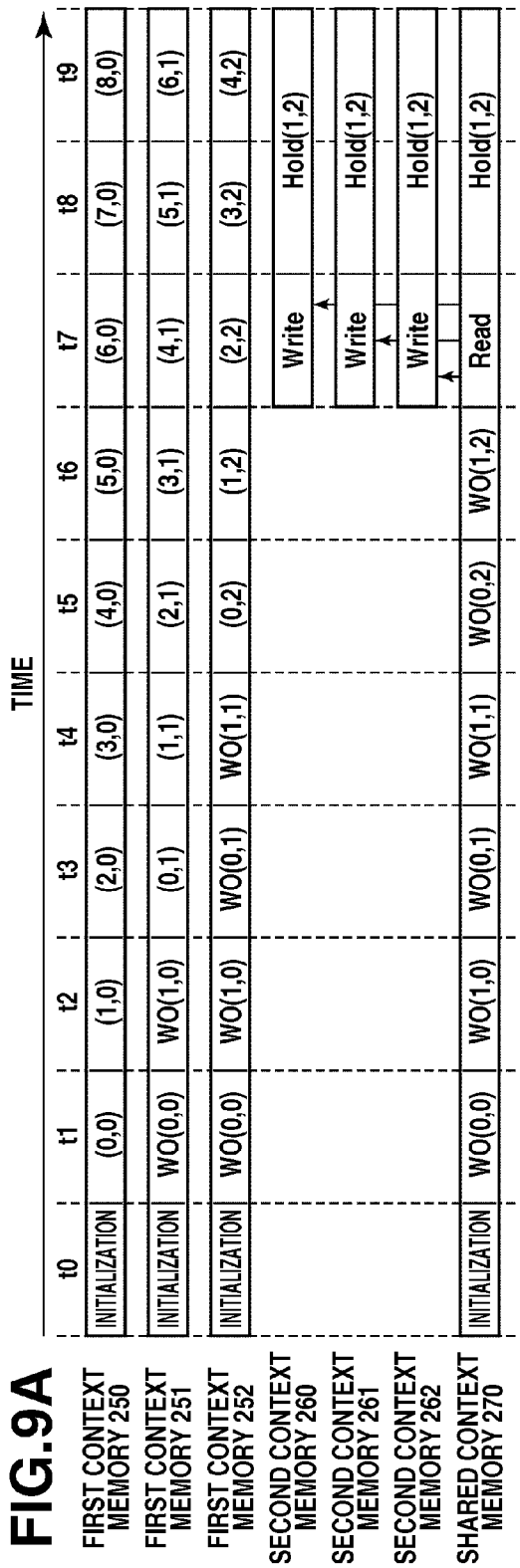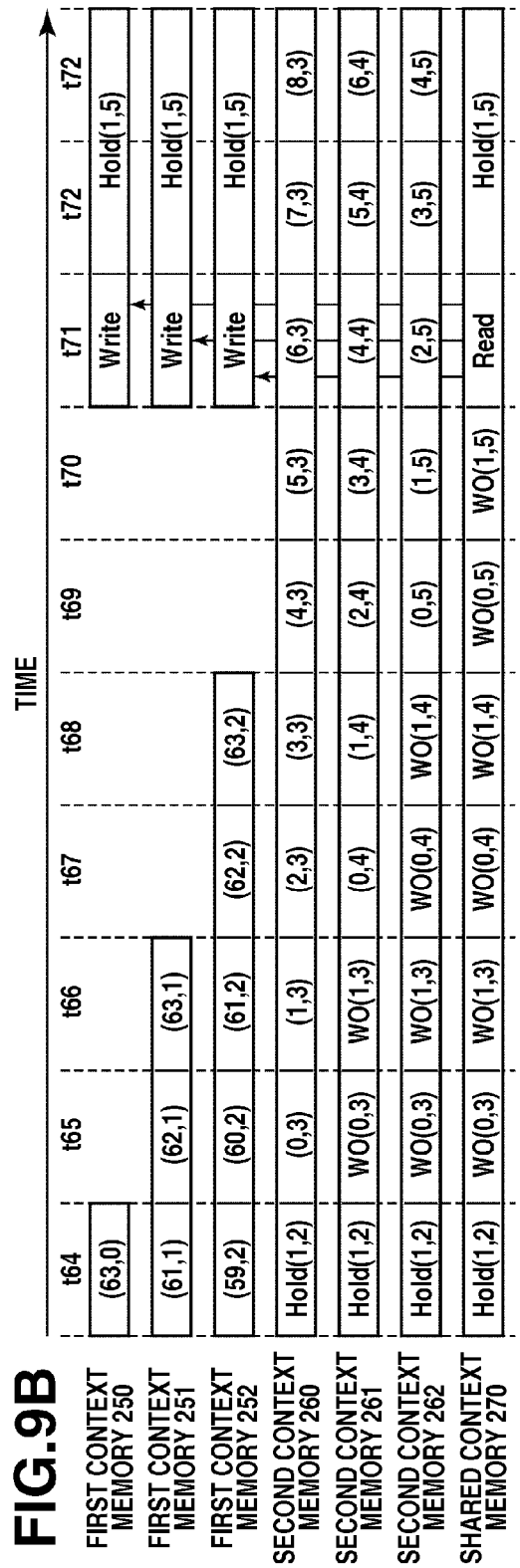

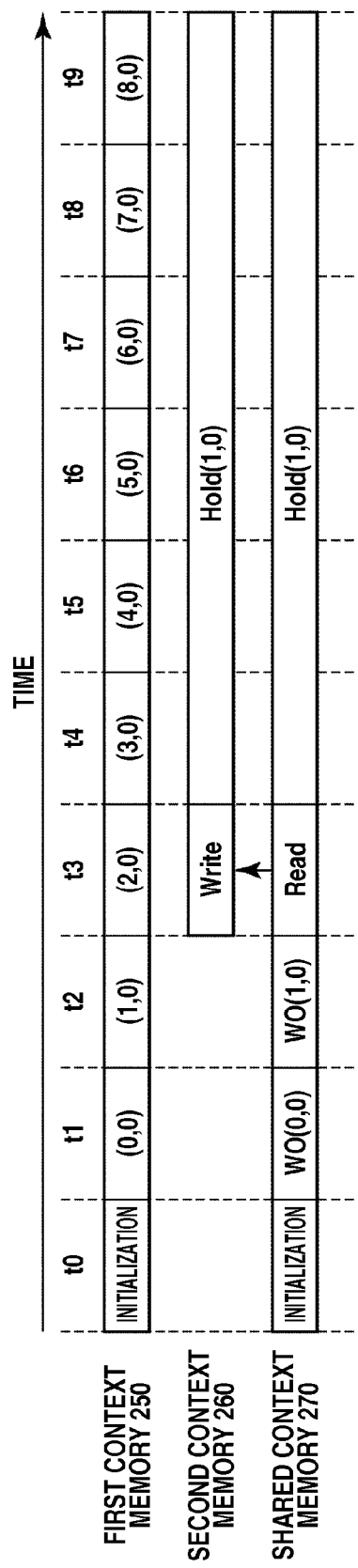
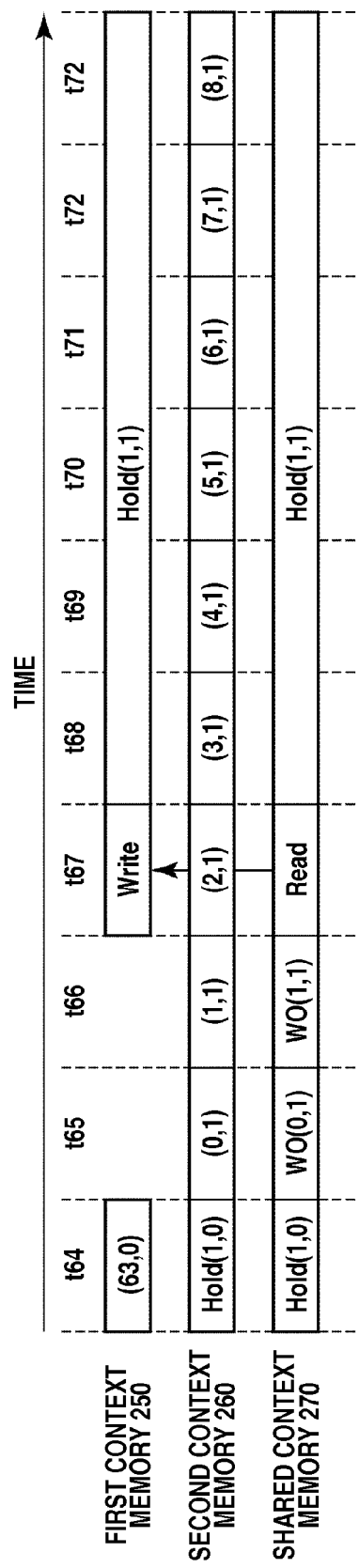

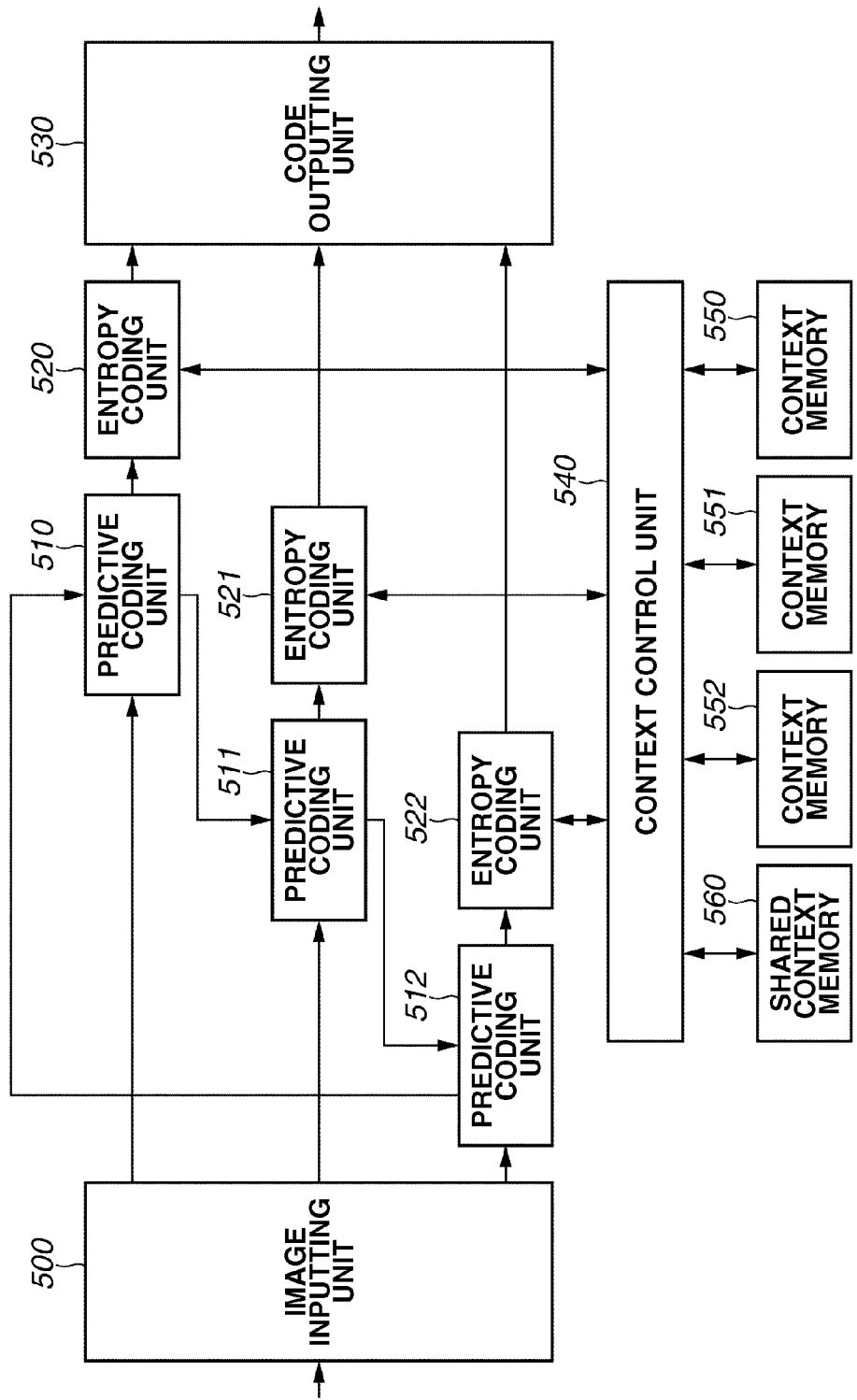

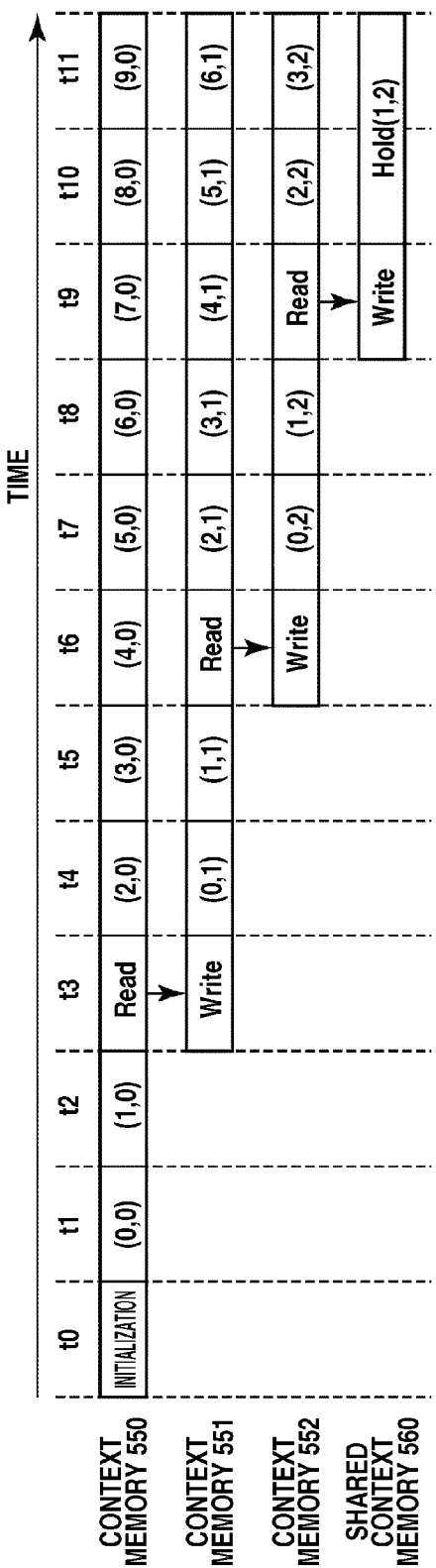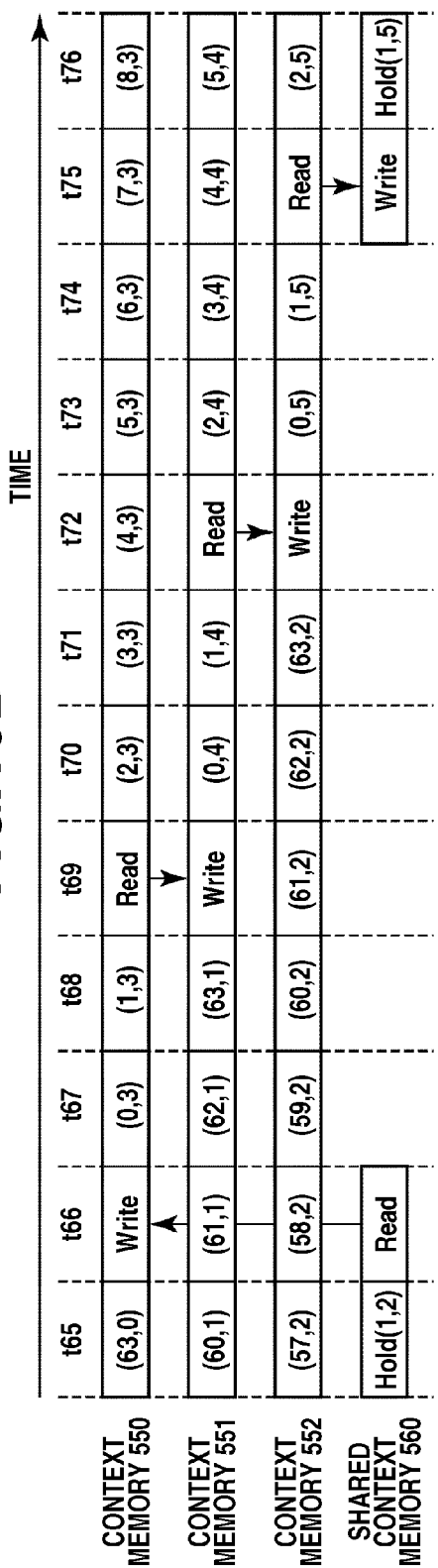

IMAGE CODING APPARATUS, IMAGE CODING METHOD, AND RECORDING MEDIUM THEREOF, IMAGE DECODING APPARATUS, AND IMAGE DECODING METHOD, AND RECORDING MEDIUM THEREOF

BACKGROUND

Field of the Disclosure

Aspects of the present invention generally relate to an image coding apparatus, an image coding method, a recording medium. Further, the present invention relates to an image decoding apparatus, an image decoding method, and a recording medium. More specifically, the present invention relates to entropy coding processing and entropy decoding processing.

Description of the Related Art

H.264/MPEG-4 AVC (hereinafter, referred to as "H.264") is a conventionally known coding method usable for compression recording of moving images (see ITU-T H.264 (March 2010) Advanced video coding for generic audio visual services).

Recent activity for a succession of H.264 includes promoting international standardization of a highly efficient coding method. Joint Collaborative Team on Video Coding (JCT-VC) has been established for ISO/IEC and ITU-T. JCT-VC plays an important role in advancing the standardization of High Efficiency Video Coding (hereinafter, referred to as "HEVC") method (see JCT-VC (contribution) JCTVC-H1003, internet <http://phenix.int-evry.fr/jct/doc_end_user/documents/8 San%20Jose/wg11/>).

Various coding tools are widely introduced to advance the standardization of HEVC, from the viewpoint of improvement in coding efficiency as well as easiness in implementation or reduction of processing time. For example, using a multi-core CPU is useful in reducing the processing time because it can enhance the parallelism of the processing. One of such methods is a "wavefront" method characterized by parallel processing of the context-based adaptive binary arithmetic coding (hereinafter, referred to as "CABAC") processing (CT-VC (contribution) JCTVC-F274 doc, internet <http://phenix.int-evry.fr/jct/doc_end_user/documents/6_Torino/wg11/>).

According to CABAC, the parameter to be referred to in performing arithmetic coding is a context parameter. The context parameter represents an occurrence probability of binary data corresponding to a coding target syntax element (e.g., conversion factor or header information) and is a value of a symbol (0 or 1) having a higher occurrence probability. The context parameter is updated each time the symbol is coded or decoded. Therefore, there is a dependence relationship between blocks with respect to the context parameter. For example, when an image processing apparatus performs parallel processing for each block line having a height comparable to one block, it is necessary to initialize the context parameter before starting coding processing for a block positioned on the left side of a picture. However, performing the above-mentioned initialization of the context parameter is disadvantageous in that the coding efficiency deteriorates significantly.

On the other hand, according to the wavefront method, at the time when coding processing for a predetermined number of blocks designated beforehand has been completed, the context parameter is referred to in processing a block positioned on the left side of the next block line. Thus, it is feasible to perform the parallel processing while suppressing reduction in the coding efficiency. FIG. 14 illustrates a picture that is divided into a plurality of blocks. In FIG. 14, sixty-four blocks (0,0) to (63,0) are arrayed in the horizontal direction to cooperatively constitute one block line. Similarly, sixty-four blocks (0,1) to (63,1) cooperatively constitute a block line. Sixty-four blocks (0,2) to (63,2) cooperatively constitute a block line. The coding processing includes performing parallel processing for each of the above-mentioned block lines. The coding processing further includes coding the block (2,0) and the block (0,1) referring to the context parameter at the completion timing of the processing performed for the block (1,0), and updating each context parameter independently. Similarly, the coding processing includes coding the block (2,1) and the block (0,2) referring to the context parameter at the completion timing of the processing performed for the block (1,1), and updating each context parameter independently. The above-mentioned procedure for the coding processing is similarly applicable to decoding processing.

FIG. 15 is a block diagram illustrating a conventional image coding apparatus that can perform a coding operation according to the wavefront method. An image inputting unit 500 divides an input picture into three block lines, which are input in parallel to predictive coding units 510 to 512, respectively. Each of the predictive coding units 510 to 512 performs inter-frame prediction processing or intra-frame prediction processing on the input image. The predictive coding units 510 to 512 derive differential data representing differences between the predicted image and the input image, and perform conversion and quantization processing on the differential data to output conversion factors. Further, each predictive coding unit outputs header information (e.g., prediction mode). Entropy coding units 520 to 522 arithmetically encode the conversion factors and the header information with reference to context parameters stored in context memories 550 to 552. Each arithmetically coded data is output via a code outputting unit 530 to an external device. Further, the entropy coding units 520 to 522 update the context parameters stored in the context memories 550 to 552 according to the obtained coding result.

An operation for updating context memories, which can be performed by the image coding apparatus when the image coding apparatus encodes the picture illustrated in FIG. 14, is described in detail below with reference to timing charts illustrated in FIGS. 16A and 16B. First, at time t0 illustrated in FIG. 16A, the image coding apparatus initializes the context memory 550. The entropy coding unit 520 encodes two blocks (0,0) and (1,0) while referring to and updating the context parameter stored in the context memory 550. At time t3, that is, when the processing for the block (1,0) has been completed, the image coding apparatus copies the context parameter from the context memory 550 to the context memory 551. The entropy coding unit 521 arithmetically encodes two blocks (0,1) and (1,1) while referring to and updating the context parameter stored in the context memory 551. At time t6, the image coding apparatus copies the context parameter from the context memory 551 to the context memory 552. The entropy coding unit 522 encodes two blocks (0,2) and (1,2) in parallel.

After completing the coding processing for the block (1,2), that is, at time t9, a context control unit 540 copies the context parameter from the context memory 552 to a shared context memory 560 to start coding processing for the block (0,3). At time t66, the context control unit 540 copies the context parameter from the shared context memory 560 to the context memory 550. Similarly, at times t69, t72, and t75, the context control unit 540 performs processing for copying the context parameter from the context memory 550 to the context memory 551, from the context memory 551 to the context memory 552, and from the context memory 552 to the shared context memory 560, respectively.

As described with reference to FIGS. 16A and 16B, according to the wavefront method, the image coding apparatus performs the processing for copying the context parameter from a memory to another memory two times for each block line. The first copy processing includes reading a context parameter from a context memory corresponding to the upper block line before starting the processing for the block line. The second copy processing includes writing a context parameter into a context memory corresponding to the lower block line at completion timing of processing performed for two blocks. The coding processing stops during the context parameter copy processing. Therefore, performances in the coding processing deteriorate significantly.

SUMMARY

Aspects of the present invention relates to an image coding apparatus capable of eliminating the processing for copying a context parameter and speedily completing the coding processing.

According to an aspect of the present invention, an image coding apparatus that encodes input image data for each of a predetermined number of block lines, includes a first entropy coding unit configured to encode a first block line based on an entropy coding related parameter read from a first context memory, and store a second parameter updated based on a result of the coding in a shared context memory, a memory control unit configured to write the second parameter stored in the shared context memory into a second context memory, and a second entropy coding unit configured to encode a predictively-coded second block line, which is a block line following the first block line, based on the second parameter read from the second context memory, and store a third parameter updated based on a result of the coding into the shared context memory.

Further features and aspects of the present disclosure will become apparent from the following detailed description of exemplary embodiments with reference to the attached drawings.

BRIEF DESCRIPTION OF THE DRAWINGS

FIGS. 3A and 3B are timing charts illustrating a context memory updating operation that can be performed by the image coding apparatus according to the first exemplary embodiment.

FIG. 4 is a timing chart illustrating a context memory updating operation that can be performed by an image coding apparatus according to a modified example 1 of the first exemplary embodiment.

FIG. 5 is a block diagram illustrating an example configuration of an image coding apparatus according to a modified example 2 of the first exemplary embodiment.

FIGS. 9A and 9B are timing charts illustrating a context memory updating operation that can be performed by the image coding apparatus according to the second exemplary embodiment.

FIGS. 11A and 11B are timing charts illustrating a context memory updating operation that can be performed by the image coding apparatus according to the modified example of the second exemplary embodiment.

FIG. 15 is a block diagram illustrating an example configuration of a conventional image coding apparatus.

FIGS. 16A and 16B are timing charts illustrating a context memory updating operation that can be performed by a conventional image coding apparatus.

DESCRIPTION OF THE EMBODIMENTS

Exemplary embodiments of the present invention are described in detail below with reference to attached drawings. Configurations described in the following exemplary embodiments are mere examples. The present invention is not limited to the illustrated configurations.

Figure 1:
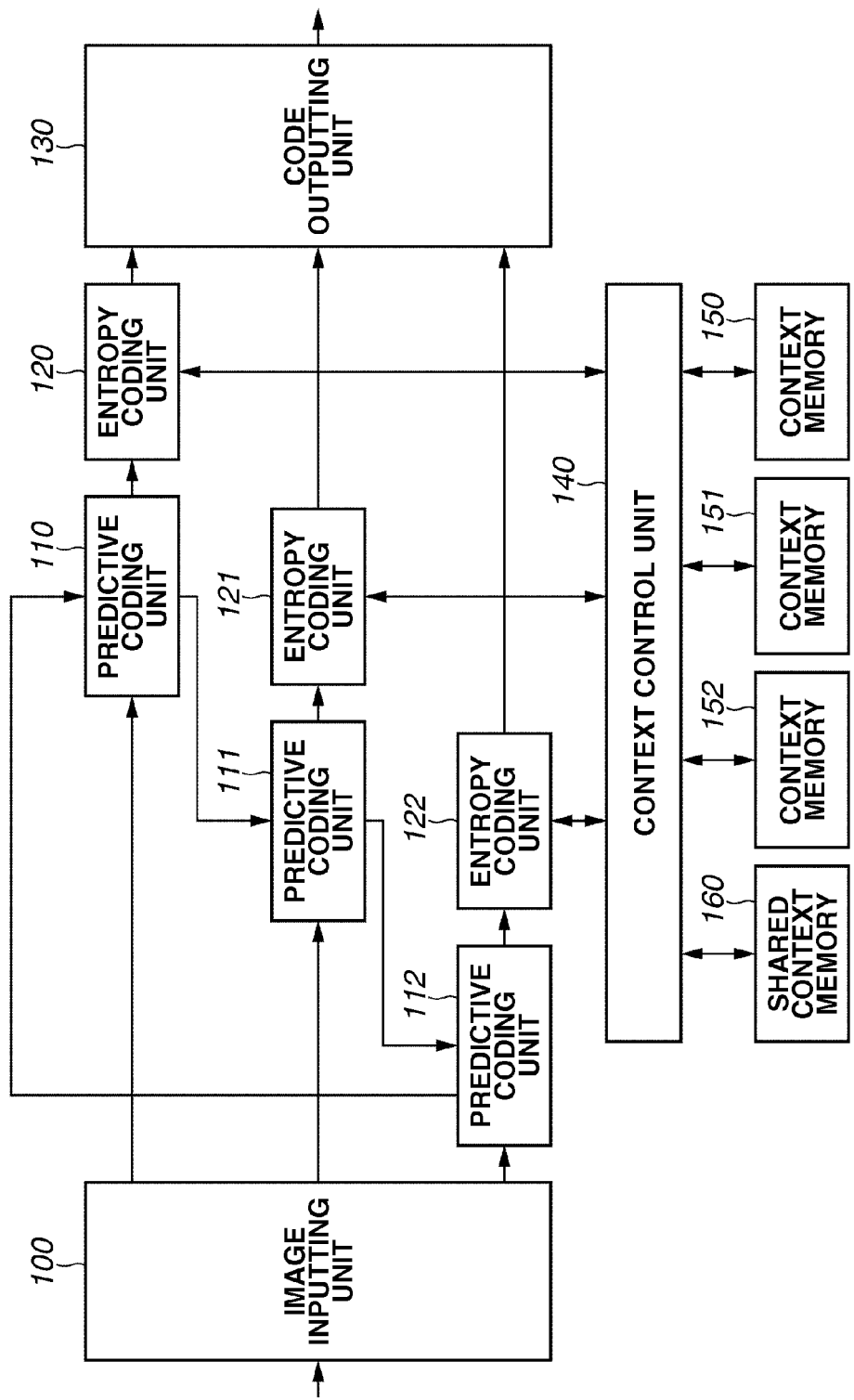
FIG. 1 is a block diagram illustrating an example configuration of an image coding apparatus 140 according to a first exemplary embodiment.

An image coding apparatus according to a first exemplary embodiment of the present invention is described in detail below with reference to FIG. 1. FIG. 1 is a block diagram illustrating an example configuration of the image coding apparatus according to the present exemplary embodiment.

An image inputting unit 100 divides each slice of a picture, which is divided into a plurality of slices beforehand, into three block lines and outputs respective block lines to the predictive coding units 110 to 112 on a block-by-block basis. The image coding apparatus according to the present exemplary embodiment performs parallel coding processing for every three block lines. However, the present invention is not limited to the illustrated example.

The predictive coding units 110 to 112 perform inter-frame prediction processing or intra-frame prediction processing on an image divided into block lines. Further, the predictive coding units 110 to 112 can derive differential data representing differences between the predicted image and the input image. The predictive coding units 110 to 112 can perform conversion and quantization processing on the differential data, and can output conversion factors. Further, the predictive coding units 110 to 112 can output header information (e.g., motion vector and prediction mode). The intra-frame prediction processing or the header information coding processing includes referring to a pixel value, a motion vector, and a prediction mode of a neighboring block. Therefore, the predictive coding units 110 to 112 transmit and receive this kind of information to and from another unit.

The entropy coding units 120 to 122 can read context parameters from context memories 150 to 152 and can perform arithmetic coding processing on the read context parameters. As mentioned in the description of the prior art, the context parameter represents an occurrence probability of binary data corresponding to the syntax element (e.g., conversion factor or header information) and is a value of symbol (0 or 1) having a higher occurrence probability. The entropy coding units 120 to 122 update the context parameters based on results of the arithmetic coding processing, and write the updated context parameters into the corresponding context memories 150 to 152. Each arithmetically coded data can be output via a code outputting unit 130 to an external device. An example procedure of the arithmetic coding processing is described in the above-described JCT-VC (contribution) JCTVC-H1003, internet <http://phenix.int-evry.fr/jct/doc_end_user/documents/8 San%20Jose/wg11/>. Therefore, redundant description thereof will be avoided.

The context memories 150 to 152 and a shared context memory 160 store context parameters to be used by the entropy coding units 120 to 122. A context control unit 140 can control each of the context memories 150 to 152 and the shared context memory 160. The context control unit 140 has a configuration described in detail below with reference to FIG. 2.

The context control unit 140 includes three selectors 1400 to 1402 configured to select data to be written into the context memories 150 to 152, which is one of three pieces of data output from respective entropy coding units 120 to 122 or the data output from the shared context memory 160. The data output from the entropy coding units 120 to 122 are context parameters updated by the entropy coding units 120 to 122. The context control unit 140 further includes a selector 1403 configured to select a piece of data to be written into the shared context memory 160, which is one of three pieces of data output from the entropy coding units 120 to 122. A context memory control unit 1410 can control the selectors 1400 to 1403. The data read from the context memories 150 to 152 can be sent to the entropy coding units 120 to 122, respectively. The data read from the shared context memory 160 can be sent to the selectors 1400 to 1402.

Figure 2:
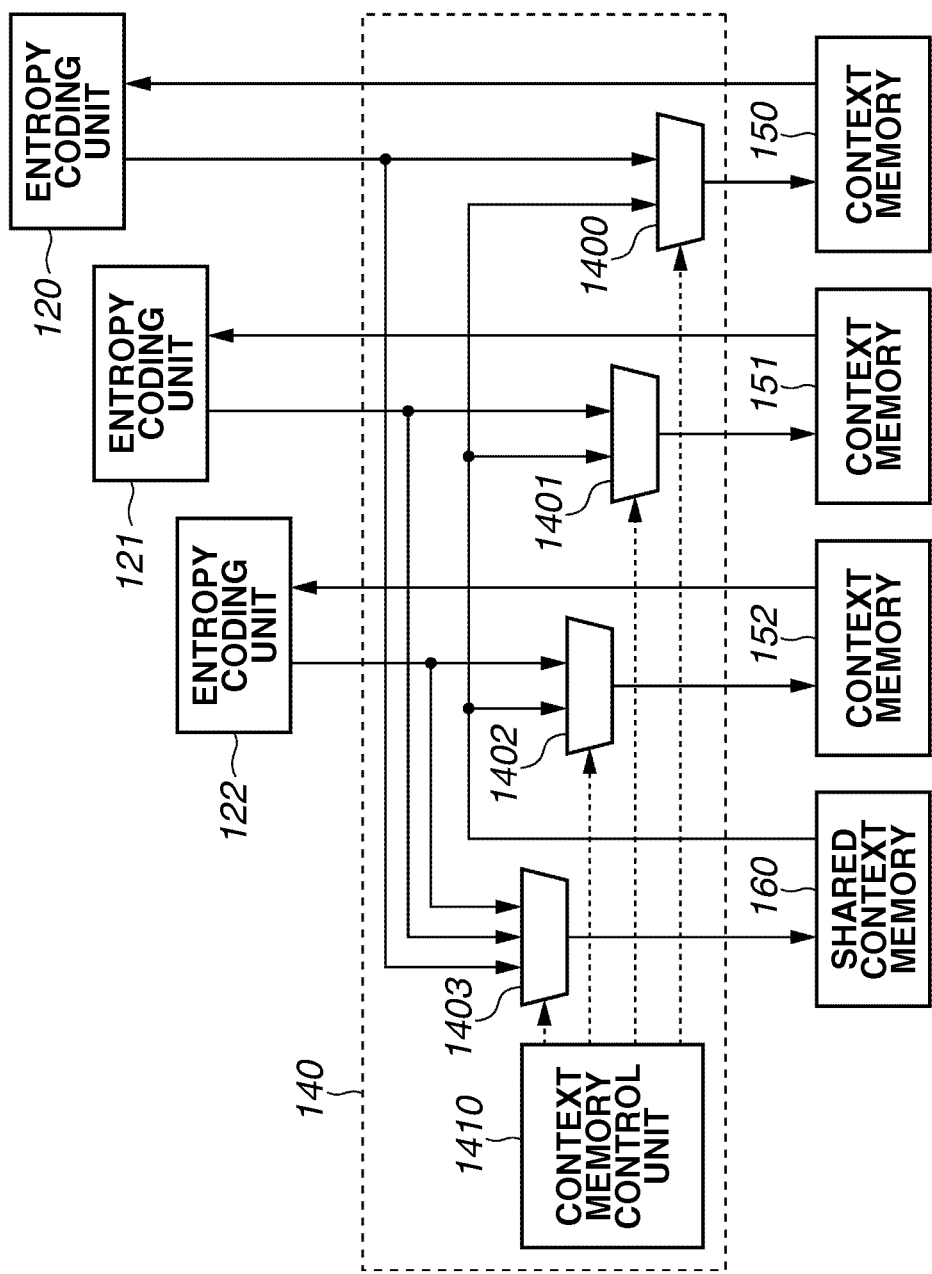
FIG. 2 is a block diagram illustrating an example configuration of a context control unit 140.

As apparent from FIG. 2, the context control unit 140 is configured to write output data, if it is output from the entropy coding unit 120, into both of the context memory 150 and the shared context memory 160. Similarly, the context control unit 140 is configured to write output data, if it is output from the entropy coding unit 121, into both of the context memory 151 and the shared context memory 160. The context control unit 140 is configured to write output data, if it is output from the entropy coding unit 122, into both of the context memory 152 and the shared context memory 160.

Figure 14:
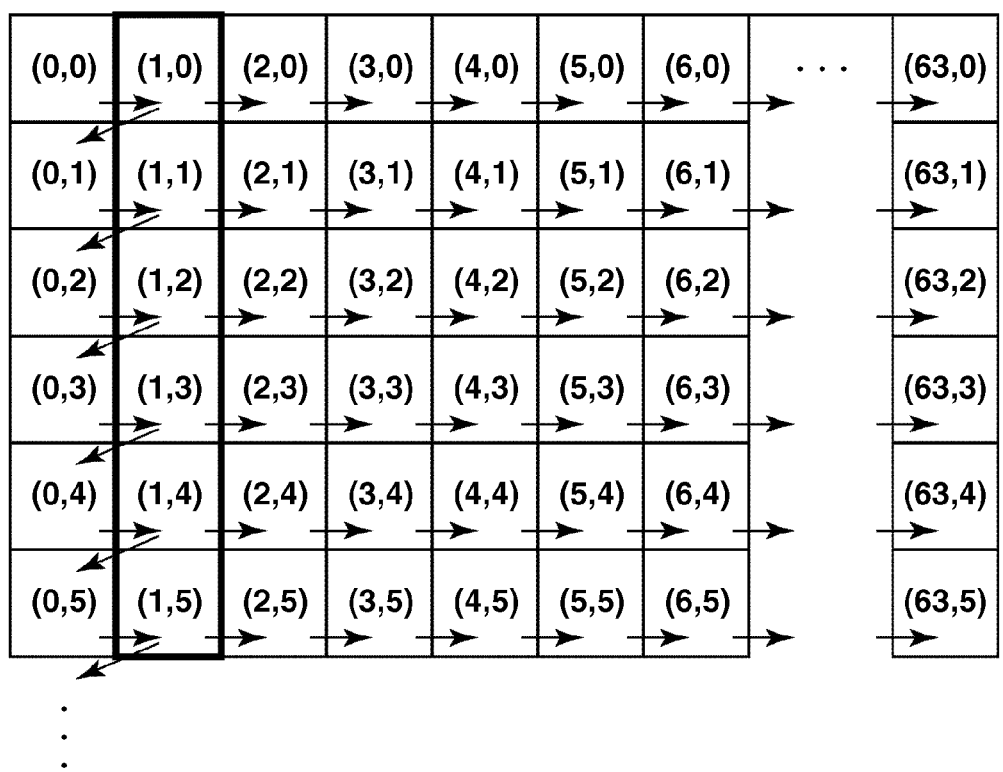
FIG. 14 illustrates a context parameter reference relationship between blocks according to the wavefront method.

Next, an example operation, in which the image coding apparatus according to the present exemplary embodiment encodes a picture illustrated in FIG. 14 and the context memories 150 to 152 and the shared context memory 160 are updated, is described with reference to timing charts illustrated in FIGS. 3A and 3B.

First, at time t0 illustrated in FIG. 3A, the entropy coding unit 120 initializes the context memory 150 and the shared context memory 160 by writing an initial value of the context parameter to each memory. However, the present invention is not limited to the above-mentioned example. Alternatively, the entropy coding unit 121 or 122 or the context memory control unit 1410 can initialize the context memory 150 and the shared context memory 160.

Next, at times t1 and t2, the entropy coding unit 120 encodes the block (0,0) and the block (1,0) with reference to the context parameters stored in the context memory 150, and updates the context parameters. In this case, the context memory control unit 1410 performs control processing in such a way as to write the context parameter updated by the entropy coding unit 120 into both of the context memory 150 and the shared context memory 160. More specifically, the context memory control unit 1410 updates both of the context memory 150 and the shared context memory 160.

In FIGS. 3A and 3B, WO (0,0) indicates that the updated context parameter is written as a result of the coding processing performed for the block (0,0). On the other hand, (0,0) indicates that reading of the context parameter and writing of the updated context parameter are both performed.

At time t3, that is, when the processing for the block (1,0) has been completed, the context memory control unit 1410 reads the context parameter from the shared context memory 160, and writes the readout context parameter into the context memory 151. More specifically, the context memory control unit 1410 copies the context parameter from the shared context memory 160 to the context memory 151. In parallel, the entropy coding unit 120 performs coding processing for the block (2,0).

At time t4, the entropy coding unit 121 starts coding processing for a block line starting with block (0,1). The entropy coding unit 121 encodes two blocks (0,1) and (1,1) while referring to and updating the context parameter stored in the context memory 151. In this case, the context memory control unit 1410 performs control processing in such a way as to write the context parameter updated by the entropy coding unit 121 into both of the context memory 151 and the shared context memory 160. On the other hand, the context memory control unit 1410 performs control processing in such a way as to write the context parameter updated by the entropy coding unit 120 into only the context memory 150.

At time t6, that is, when the processing for the block (1,1) has been completed, the context memory control unit 1410 copies the context parameter from the shared context memory 160 to the context memory 152. In parallel, the entropy coding unit 120 performs coding processing for the block (5,0). The entropy coding unit 121 performs coding processing for the block (2,1).

At time t7, the entropy coding unit 122 starts coding processing for a block line starting with block (0,2), while referring to and updating the context parameter stored in the context memory 152. Similar to the processing performed at times t1, t2, t4, and t5, the context memory control unit 1410 performs control processing in such a way as to write the context parameter updated by the entropy coding unit 122 into both of the context memory 152 and the shared context memory 160. The context parameter obtained at time t8, that is, when the coding processing for the block (1,2) has been completed, is stored in the shared context memory 160. The stored context parameter is continuously held during the time interval from time t9 to time t64 (see FIGS. 3A and 3B). In FIGS. 3A and 3B, Hold(1,2) indicates that the context parameter is stored without being updated.

At time t64, that is, when the coding of the block (63,0) has been completed, the entropy coding unit 120 requires a context parameter of the block (1,2) to perform processing for the block (0,3). Therefore, at time t65, the context memory control unit 1410 copies the context parameter of the block (1,2) from the shared context memory 160 to the context memory 150.

During the time interval from time t66 to time t67, the entropy coding unit 120 performs coding processing for two blocks (0,3) and (1,3), and writes the updated context parameter into both of the context memory 150 and the shared context memory 160.

The entropy coding unit 121 requires a context parameter of the block (1,3) to perform processing for the block (0,4). Therefore, at time t68, the context memory control unit 1410 copies the context parameter of the block (1,3) from the shared context memory 160 to the context memory 151.

As mentioned above, the image coding apparatus according to the present exemplary embodiment writes the updated context parameter into the context memory corresponding to each entropy coding unit and into the shared context memory until it completes the coding processing for two blocks positioned on the left side of the slice. Through the above-mentioned processing, the shared context memory can prepare the context parameter to be used in the coding processing for a block positioned on the left side of the lower block line at the completion timing of the coding processing performed for two blocks positioned on the left side of the slice. Accordingly, it is unnecessary to perform the processing for copying the context parameter to a corresponding context memory of the lower block line, which was necessary for the conventional image coding apparatus (see the copy processing at times t3, t6, t9, t69, t72, and t75 in FIGS. 16A and 16B). Therefore, the image coding apparatus according to the present exemplary embodiment can speedily complete the coding processing.

The entropy coding method employed for the image coding apparatus according to the present exemplary embodiment is arithmetic coding. However, the present invention is not limited to the above-mentioned example. For example, it is useful to employ variable length coding.

Although the entropy coding units 120 to 122 update the context parameters based on results of the arithmetic coding processing, there may be a coding target syntax element that does not require the update of these context parameters. For example, regarding a flag representing a terminal end of a block line, it is useful to constantly use an initial value of a context parameter having been set before starting the processing for the slice.

Further, the image coding apparatus according to the present exemplary embodiment writes the same context parameter into a context memory corresponding to each entropy coding unit and into the shared context memory until it completes the processing for two blocks positioned on the right side of the slice. However, in the present invention, the number of blocks is not limited to only two. It can be one or three.

Further, the image coding apparatus according to the present exemplary embodiment initializes only one context memory 150 together with the shared context memory 160. However, it is useful to initialize all of the context memories 150 to 152 as illustrated in FIG. 4.

Further, it is useful to write the same context parameter into each of a context memory corresponding to an entropy coding unit, a context memory corresponding to a subsequent block line, and a shared context memory. For example, as illustrated in FIG. 4, it is useful to write the context parameter updated by the entropy coding unit 120 into the context memories 150 to 152 and the shared context memory 160 (time t1 to t2). It is useful to write the context parameter updated by the entropy coding unit 121 into the context memories 151 to 152 and the shared context memory 160 (time t3 to t4). When the above-mentioned processing is performed, it is unnecessary to copy the context parameter from the shared context memory to the context parameter (see times t3 and t6 illustrated in FIG. 3A) for the upper N block lines (N represents the total number of the entropy coding units).

Further, in the present exemplary embodiment, the number of parallel entropy coding units is not limited to the above-mentioned example, and it is useful to employ a configuration that does not perform the parallel processing, for example, by providing only one entropy coding unit as illustrated in FIG. 5.

Figure 6:
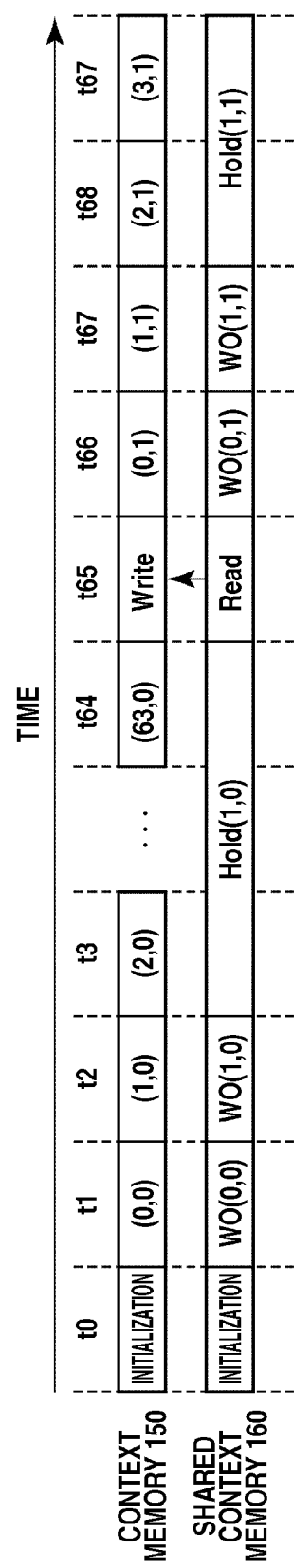
FIG. 6 is a timing chart illustrating a context memory updating operation that can be performed by the image coding apparatus according to the modified example 2 of the first exemplary embodiment.

FIG. 6 is a timing chart illustrating an operation for updating the context memory 150 and the shared context memory 160, which can be performed by the image coding apparatus illustrated in FIG. 5. Similar to the first exemplary embodiment, first, the image coding apparatus initializes the context memory 150 and the shared context memory 160. When the image coding apparatus performs coding processing for the blocks (0,0) and (1,0), the image coding apparatus writes the context parameter updated by the entropy coding unit 120 into both of the context memory 150 and the shared context memory 160. Through the above-mentioned processing, the context parameter corresponding to the block (1,0) is held in the shared context memory 160 at the completion timing (t2) of the coding processing performed for the block (1,0). Accordingly, the image coding apparatus can speedily complete the coding processing because it is unnecessary to copy the context parameter from the context memory 150 to the shared context memory 160.

Figure 7:
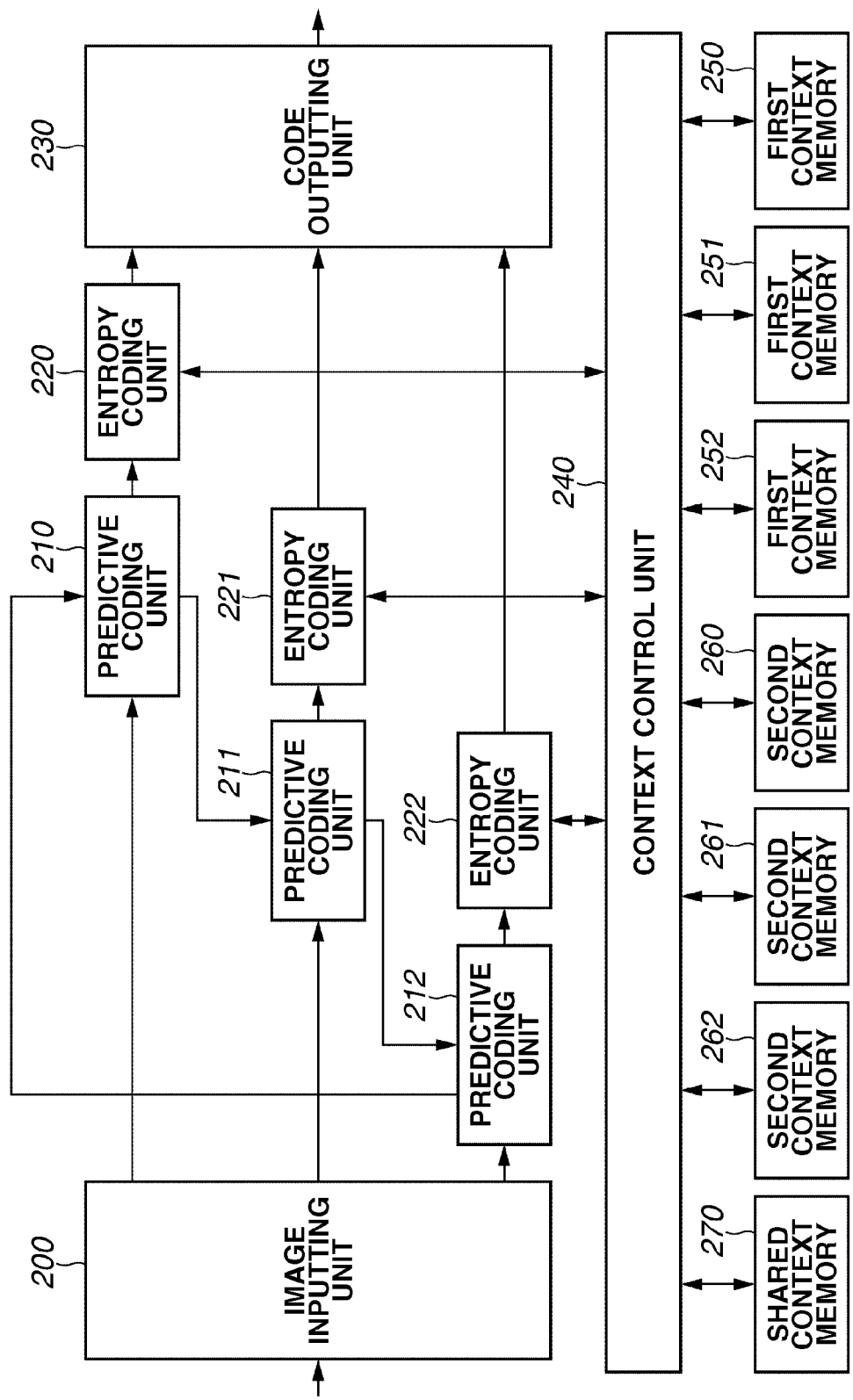
FIG. 7 is a block diagram illustrating an example configuration of an image coding apparatus according to a second exemplary embodiment.

An image coding apparatus according to a second exemplary embodiment of the present invention is described in detail below with reference to FIG. 7. FIG. 7 is a block diagram illustrating an example configuration of the image coding apparatus according to the present exemplary embodiment. The image coding apparatus illustrated in FIG. 7 includes an image inputting unit 200, three predictive coding units 210 to 212, three entropy coding units 220 to 222, and a code outputting unit 230, which are functionally similar to the corresponding constituent components described in the first exemplary embodiment. Therefore, redundant description thereof will be avoided.

The image coding apparatus illustrated in FIG. 7 further includes first context memories 250 to 252, second context memories 260 to 262, and a shared context memory 270, which are memories that store context parameters to be used by the entropy coding units 220 to 222. The first context memory 250 and the second context memory 260 can be referred to by the entropy coding unit 220. Similarly, the first context memory 251 and the second context memory 261 can be referred to by the entropy coding unit 221. The first context memory 252 and the second context memory 262 can be referred to by the entropy coding unit 222. In the following description, the first context memories 250 to 252 collectively constitute a first context memory group. The second context memories 260 to 262 collectively constitute a second context memory group.

The image coding apparatus illustrated in FIG. 7 further includes a context control unit 240, which controls writing and reading of information/data into and from the first context memory group, the second context memory group, and the shared context memory 270. An example configuration of the context control unit 240 will be described referring to FIG. 8.

The context control unit 240 includes selectors 2400 to 2406, which can select data to be written into the first context memories 250 to 252, the second context memories 260 to 262, and the shared context memory 270, respectively. The context control unit 240 further includes selectors 2420 to 2422, which can select data to be read from the first context memories 250 to 252 and the second context memories 260 to 262, respectively. More specifically, the selector 2420 can select any one of two pieces of data read from the first context memory 250 and the second context memory 260. Similarly, the selector 2421 can select any one of two pieces of data read from the first context memory 251 and the second context memory 261. The selector 2422 can select any one of two pieces of data read from the first context memory 252 and the second context memory 262.

The context control unit 240 includes a context memory control unit 2410, which can control the selectors 2400 to 2406 and the selectors 2420 to 2422.

Figure 8:
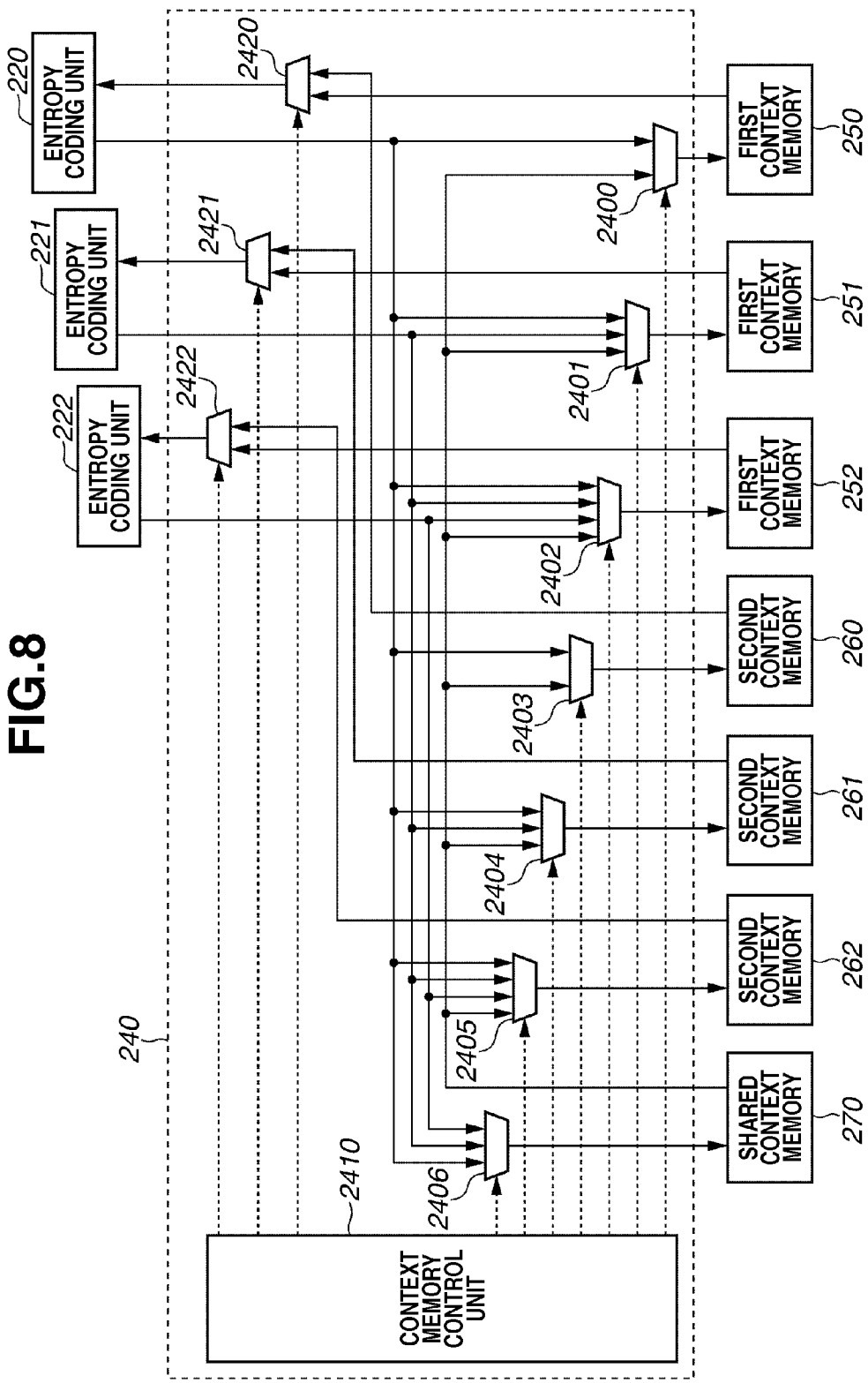
FIG. 8 is a block diagram illustrating an example configuration of a context control unit 240.

As apparent from FIG. 8, the context parameter output from the entropy coding unit 220 can be written into the first context memories 250 to 252, the second context memories 260 to 262, and the shared context memory 270. The context parameter output from the entropy coding unit 221 can be written into the first context memories 251 and 252, the second context memories 261 and 262, and the shared context memory 270. The context parameter output from the entropy coding unit 222 can be written into the first context memory 252, the second context memory 262, and the shared context memory 270. The data read from the shared context memory 270 can be written into the first context memory group and the second context memory group.

Next, an example operation for encoding the picture illustrated in FIG. 14, which can be performed by the image coding apparatus according to the present exemplary embodiment, is described in detail below with reference to timing charts illustrated in FIGS. 9A and 9B.

First, at time t0 illustrated in FIG. 9A, the entropy coding unit 220 initializes the first context memory group and the shared context memory 270 by writing an initial value of the context parameter to each memory. However, the present exemplary embodiment is not limited to the above-mentioned example. Alternatively, the entropy coding unit 221 or 222 or the context memory control unit 2410 can perform the above-mentioned initialization processing. Further, it is useful to initialize the second context memory group together with the first context memory group and the shared context memory 270.

Next, at time t1 and time t2, the entropy coding unit 220 encodes the block (0,0) and the block (1,0) while referring to and updating the context parameter stored in the first context memory 250. In this case, the context memory control unit 2410 performs control processing in such a way as to write the context parameter updated by the entropy coding unit 220 into both of the first context memory group and the shared context memory 270. More specifically, the context parameter is written into a context memory corresponding to a subsequent block line, which is one of the context memories belonging to the context memory group including the context memory 250 that corresponds to the entropy coding unit 220.

When the processing for the block (1,0) has been completed at time t2, the context parameter of the block (1,0) is held in the first context memory 251. Accordingly, at time t3, the entropy coding unit 221 starts coding processing for the block (0,1).

The entropy coding unit 221 encodes the block (0,1) and the block (1,1) while referring to and updating the context parameter stored in the first context memory 251. In this case, the context memory control unit 2410 performs control processing in such a way as to write the context parameter updated by the entropy coding unit 221 into the first context memories 251 and 252 and the shared context memory 270. On the other hand, the context memory control unit 2410 performs control processing in such a way as to write the context parameter updated by the entropy coding unit 220 into only the first context memory 250.

When the processing for the block (1,1) has been completed at time t4, the context parameter of the block (1,1) is held in the first context memory 252. Accordingly, at time t5, the entropy coding unit 222 starts coding processing for the block (0,2).

In the coding processing for two blocks (0,2) and (1,2) at time t5 to time t6, the context parameter updated by the entropy coding unit 222 is written into the first context memory 252 and the shared context memory 270. On the other hand, the context parameter updated by the entropy coding units 220 and 221 are written into the first context memories 250 and 251, respectively.

At time t7, the context memory control unit 2410 copies the context parameter from the shared context memory 270 to the second context memory. During the time interval from time t8 to time t64 (see FIGS. 9A and 9B), the context parameter of the block (1,2) is held in the second context memory and the shared context memory 270.

At time t65, the entropy coding unit 220 starts coding processing for a block line starting with block (0,3) with reference to the context parameter stored in the second context memory 260. During the time interval from time t65 to time t66, the entropy coding unit 220 performs coding processing for the blocks (0,3) and (1,3). The context memory control unit 2410 performs control processing in such a way as to write the context parameter updated by the entropy coding unit 220 into the second context memories 260 to 262 and the shared context memory 270.

When the processing for the block (1,3) has been completed at time t66, the context parameter of the block (1,3) is held in the second context memory 261. Accordingly, at time t67, the entropy coding unit 221 starts coding processing for a block line starting with block (0,4) with reference to the context parameter stored in the second context memory 261. During the time interval from time t67 to time t68, the entropy coding unit 221 performs coding processing for two blocks (0,4) and (1,4). The context memory control unit 2410 performs control processing in such a way as to write the context parameter updated by the entropy coding unit 221 into the second context memories 261 and 262 and the shared context memory 270.

Similarly, at time t69, the entropy coding unit 222 starts coding processing for the block (0,5). The context memory control unit 2410 performs control processing in such a way as to write the context parameter updated by the entropy coding unit 222 into the second context memory 262 and the shared context memory 270.

At time t71, the context memory control unit 2410 copies the context parameter from the shared context memory 270 to the first context memories 250 to 252. At time t72, the context parameter of the block (1,5) can be held in the first context memory group and the shared context memory 270.

As mentioned above, first, the image coding apparatus according to the present exemplary embodiment initializes the first context memory group and the shared context memory. Then, the image coding apparatus updates a context memory corresponding to an entropy coding unit, a context memory corresponding to a subsequent block line, and the shared context memory until it completes the encoding processing for two blocks positioned on the left side of the slice. Further, every time when the image coding apparatus completes the processing for writing the context parameters corresponding to the number of parallel entropy coding units×two blocks into the shared context memory, the image coding apparatus copies the context parameter stored in the shared context memory to the context memory group.

Accordingly, at the time when the entropy coding unit completes the coding processing for the block positioned on the right side of the slice, the context parameter to be used in the coding processing for a block positioned on the left side of the lower block line is already prepared in the context memory. Therefore, the image coding apparatus can immediately start coding processing without copying the context parameter from the shared context memory to each context memory. In other words, the image coding apparatus can speedily complete the coding processing.

The entropy coding method employed for the coding apparatus according to the present exemplary embodiment is arithmetic coding. However, the present invention is not limited to the above-mentioned example. For example, it is useful to employ variable length coding.

Although the entropy coding units 220 to 222 update the context parameters based on results of the arithmetic coding processing, there may be a coding target syntax element that does not require the update of these context parameters. For example, regarding a flag representing a terminal end of a block line, it is useful to constantly use an initial value of a context parameter having been set before starting the processing for the slice. In this case, the corresponding context parameter is not written into any one of the first context memory group, the second context memory group, and the shared context memory 270, except for writing of the initial value to be set in the memory.

Figure 10:
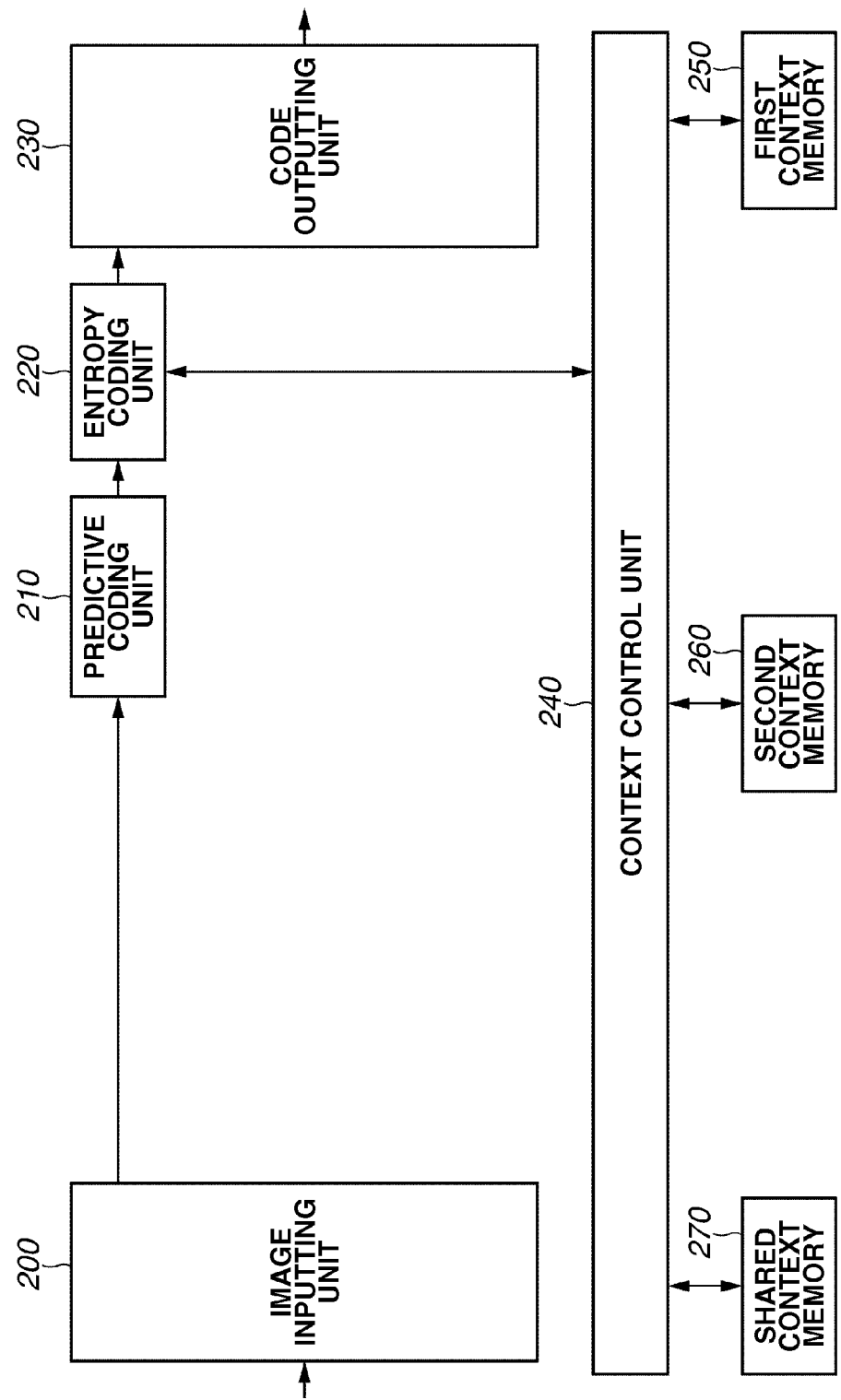
FIG. 10 is a block diagram illustrating an example configuration of an image coding apparatus according to a modified example of the second exemplary embodiment.

Further, in the present exemplary embodiment, the number of parallel entropy coding units is not limited to the above-mentioned example, and it is useful to employ a configuration that does not perform the parallel processing, for example, by providing only one entropy coding unit as illustrated in FIG. 10.

FIGS. 11A and 11B are timing charts illustrating an operation for updating the first context memory 250, the second context memory 260, and the shared context memory 270, which can be performed by the image coding apparatus illustrated in FIG. 10.

Similar to the second exemplary embodiment, first, the image coding apparatus initializes the first context memory 250 and the shared context memory 270. When the image coding apparatus performs coding processing for the blocks (0,0) and (1,0), the image coding apparatus writes the context parameter updated by the entropy coding unit 220 into both of the first context memory 250 and the shared context memory 270. After the image coding apparatus completes the coding processing for the block (1,0) at time t2, the image coding apparatus copies the context parameter from the shared context memory 270 to the second context memory 260 at time t3. Through the above-mentioned processing, the context parameter of the block (1,0) is already held in the second context memory 260 at the completion timing of the coding processing performed for the block (63,0). Accordingly, at time t65, the image coding apparatus can immediately start coding processing for the block (0,1).

Figure 12:
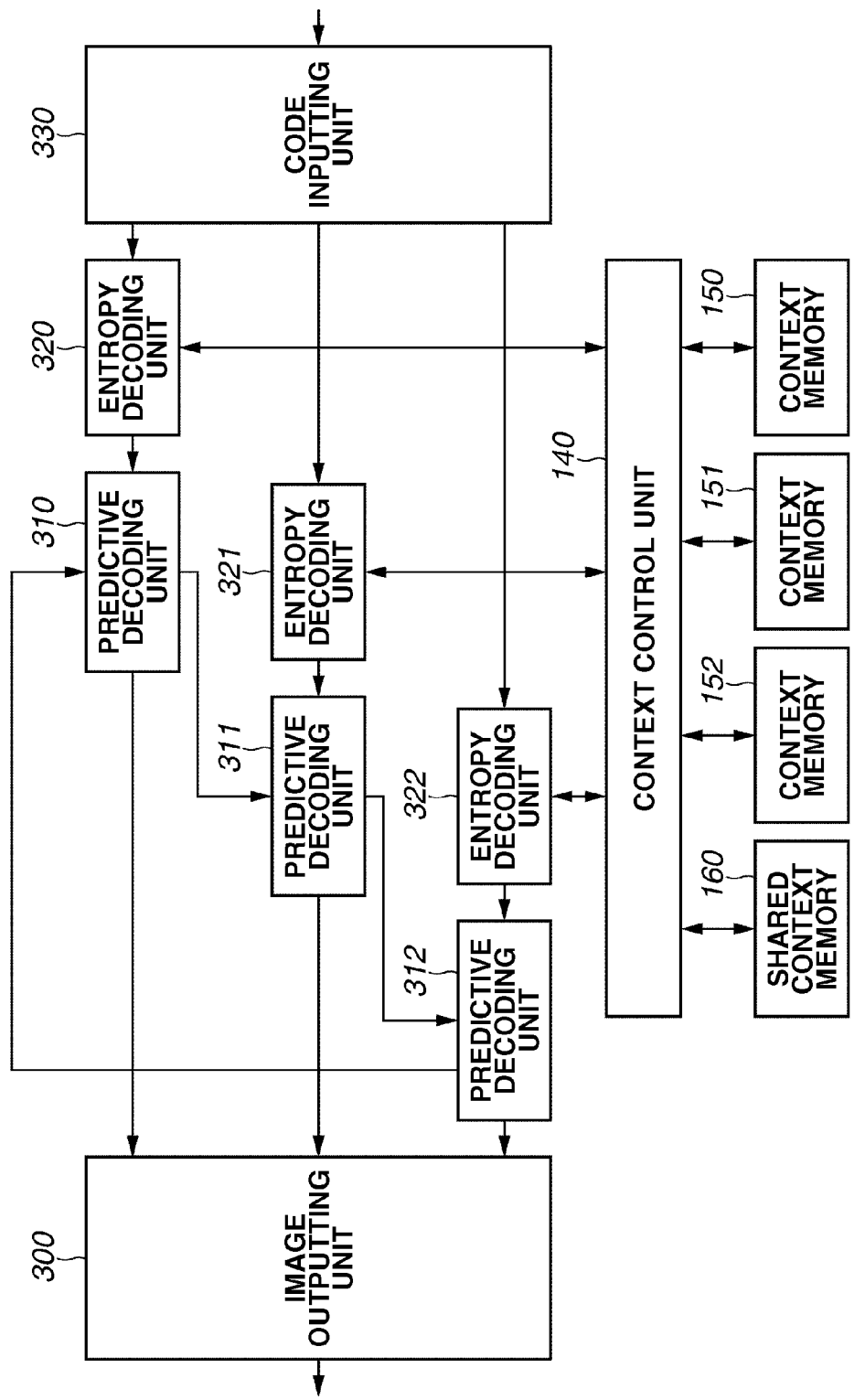
FIG. 12 is a block diagram illustrating an example configuration of an image decoding apparatus according to a third exemplary embodiment.

An image decoding apparatus according to a third exemplary embodiment of the present invention is described in detail below with reference to FIG. 12. FIG. 12 is a block diagram illustrating an example configuration of the image decoding apparatus according to the present exemplary embodiment. The image decoding apparatus illustrated in FIG. 12 includes three context memories 150 to 152, a shared context memory 160, and a context control unit 140, which are functionally similar to the corresponding constituent components illustrated in FIG. 1. A timing chart illustrating an operation that can be performed by the image decoding apparatus according to the present exemplary embodiment is similar to that illustrated in FIGS. 3A and 3B.

A code inputting unit 330 outputs code strings entropy coded in parallel for respective block lines to entropy decoding units 320 to 322, respectively, for every three block lines.

The entropy decoding unit 320 to 322 perform arithmetic decoding processing on the input code strings with reference to context parameters stored in the context memories 150 to 152, respectively. Further, the entropy decoding unit 320 to 322 update the context parameters based on results of the arithmetic decoding processing and write the updated context parameters into the corresponding context memories 152 to 150 and the shared context memory 160. The arithmetically decoded data includes conversion factors and header information (e.g., coding mode, prediction mode, and motion vector), which are output to predictive decoding units 310 to 312, respectively.

The predictive decoding units 310 to 312 perform inverse quantization and inverse conversion processing on the conversion factors to derive predicted differential data. The predictive decoding units 310 to 312 perform inter-frame predictive decoding processing or intra-frame predictive decoding processing on the predicted differential data with reference to the header information, and output the decoded image data to an image outputting unit 300.

The context control unit 140 controls the context memories 150 to 152 and the shared context memory 160. First, at time t0 in FIG. 3A, the context control unit 140 initializes the context memory 150 and the shared context memory 160 before starting decoding processing for the slice. At times t1, t2, t4, t5, t7, and t8 in FIG. 3A, the context control unit 140 writes the updated context parameter into both of the context memory and the shared context memory 160 until it completes the decoding processing for two blocks positioned on the left side of the slice.

Accordingly, at completion timing of the decoding processing performed for two blocks positioned on the left side of the slice, the context parameter to be used in the decoding processing for a block positioned on the left side of the lower block line is already prepared in the shared context memory. Accordingly, it is unnecessary to copy the context parameter to a context memory corresponding to the lower block line. In other words, the image decoding apparatus can speedily complete the decoding processing.

Figure 13:
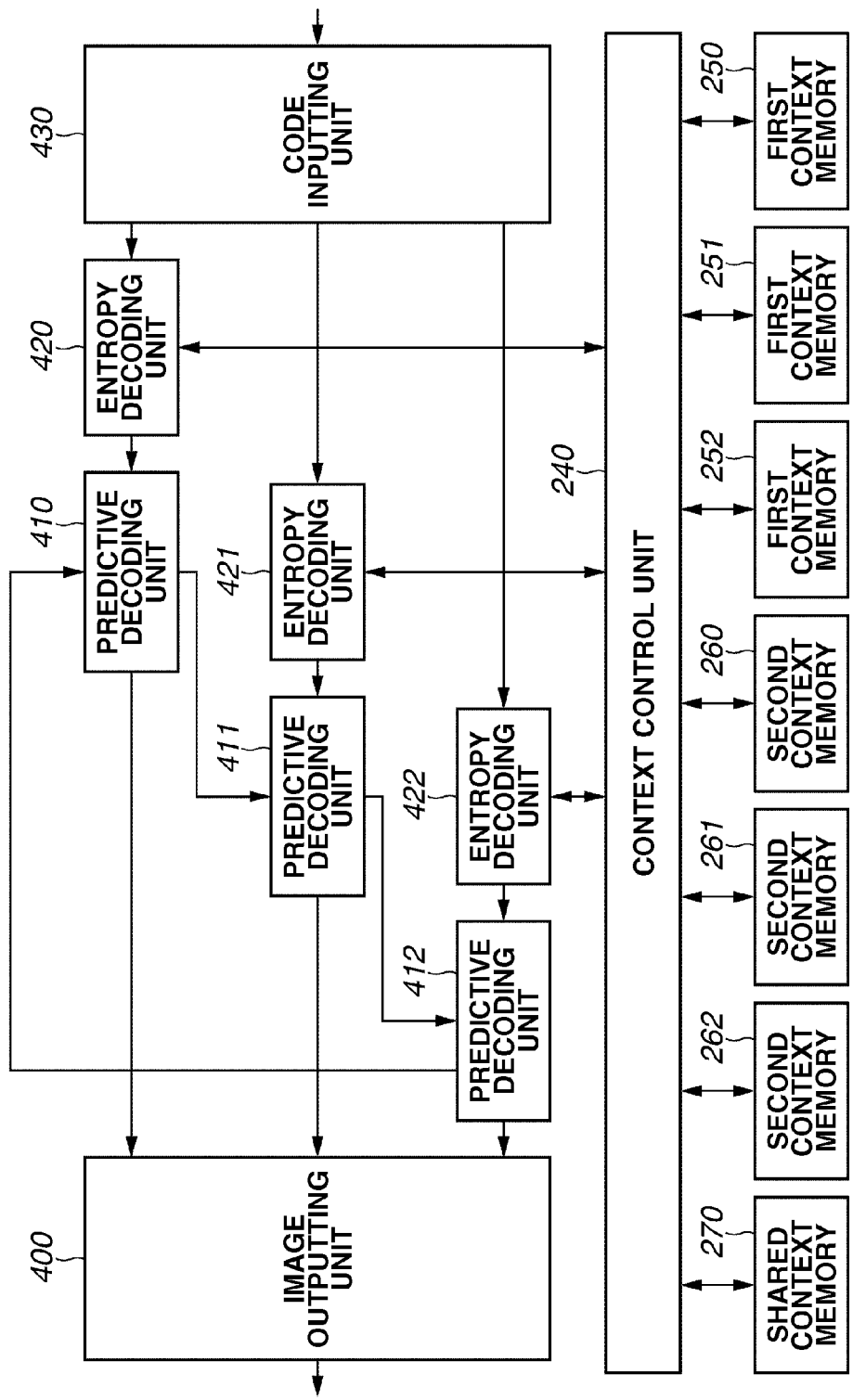
FIG. 13 is a block diagram illustrating an example configuration of an image decoding apparatus according to a fourth exemplary embodiment.

An image decoding apparatus according to a fourth exemplary embodiment of the present invention is described in detail below with reference to FIG. 13. FIG. 13 is a block diagram illustrating an example configuration of the image decoding apparatus according to the present exemplary embodiment. The image decoding apparatus illustrated in FIG. 13 includes first context memories 250 to 252, second context memories 260 to 262, a shared context memory 270, and a context control unit 240, which are functionally similar to the corresponding constituent components illustrated in FIG. 7. A timing chart illustrating an operation that can be performed by the image decoding apparatus according to the present exemplary embodiment is similar to that illustrated in FIGS. 9A and 9B.

A code inputting unit 430, entropy decoding units 420 to 422, predictive decoding units 410 to 412, and an image outputting unit 400 are similar to the corresponding constituent components of the image decoding apparatus according to the third exemplary embodiment (see FIG. 12).

First, at time t0 illustrated in FIG. 9A, the context control unit 240 initializes the first context memories 250 to 252 and the shared context memory 260 before starting the decoding processing for the slice. During the time interval from time t1 to time t6 in FIG. 9A and the time interval from time t65 to time t70 in FIG. 9B, the context control unit 240 updates a context memory corresponding to an entropy decoding unit, a context memory corresponding to a subsequent block line, and the shared context memory 270, until it completes the decoding processing for two blocks positioned on the left side of the slice. Further, every time when the image decoding apparatus completes the processing for writing the context parameters corresponding to the number of parallel entropy decoding units×two blocks into the shared context memory, the image decoding apparatus copies the context parameter stored in the shared context memory to the context memory group.

Accordingly, at the time when the entropy decoding unit completes the decoding processing for the block positioned on the right side of the slice, the context parameter to be used in the decoding processing for a block positioned on the left side of the lower block line is already prepared in the context memory. Therefore, the image decoding apparatus can immediately start decoding processing without copying the context parameter from the shared context memory to each context memory.

Each processing unit illustrated in FIG. 1, FIG. 2, FIG. 5, FIG. 7, FIG. 10, FIG. 12, and FIG. 13 has a hardware configuration, as described in the above-mentioned exemplary embodiments. However, the processing to be performed by each processing unit illustrated in the above-mentioned drawings can be realized by a computer program.

Figure 17:
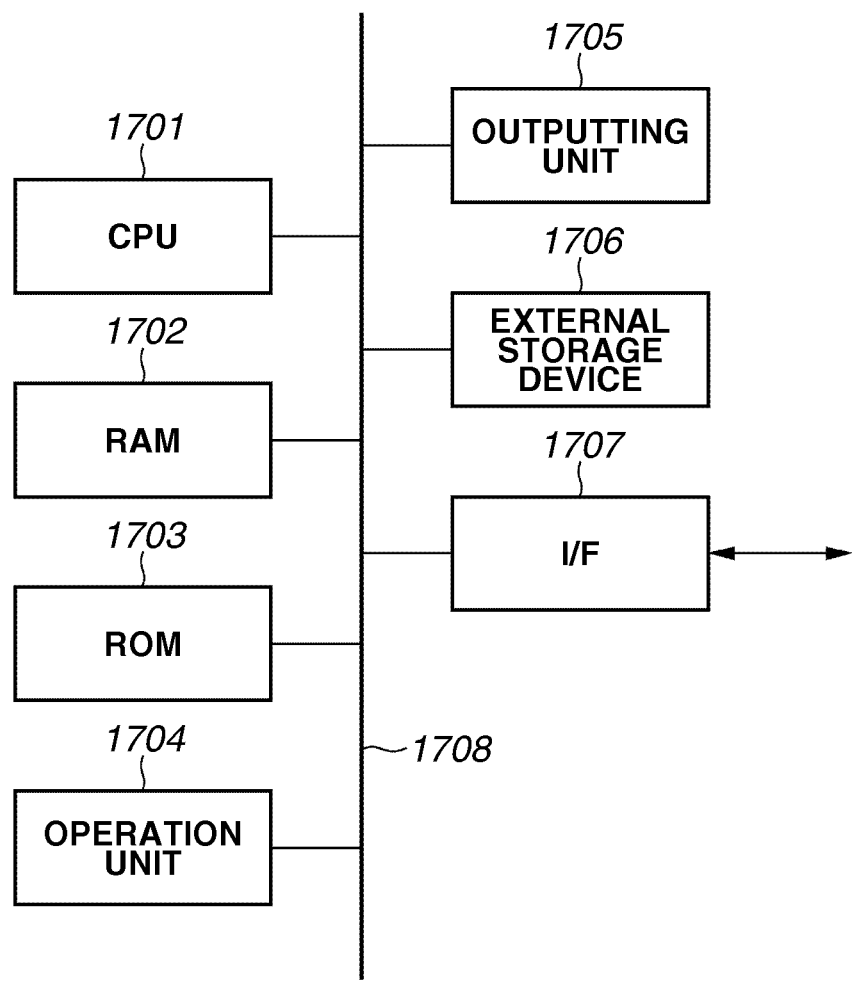
FIG. 17 is a block diagram illustrating a hardware configuration of a computer, which is applicable to an image coding apparatus or a decoding apparatus according to the present invention.

FIG. 17 is a block diagram illustrating a hardware configuration of a computer that is applicable to an image display apparatus according to each of the above-mentioned exemplary embodiments.

A central processing unit (CPU) 1701 performs various controls to be performed by the computer using a computer program and data stored in a random access memory (RAM) 1702 or a read only memory (ROM) 1703. The CPU 1701 performs each processing to be performed by the image processing apparatus described in the above-mentioned exemplary embodiments. More specifically, the CPU 1701 is functionally operable as each processing unit illustrated in the above-mentioned drawings.

The RAM 1702 has an area usable to temporarily store a computer program or data loaded from an external storage device 1706 or data acquired from an external device via an interface (I/F) 1707. Further, the RAM 1702 has a work area usable when the CPU 1701 performs various processing. More specifically, the RAM 1702 can be allocated, for example, as a frame memory. Further, other various areas can be appropriately provided.

Setting data of the computer and a boot program are stored in the ROM 1703. An operation unit 1704 includes a keyboard and a mouse. A user of the computer can operate the operation unit 1704 to input various instructions to the CPU 1701. An outputting unit 1705 outputs results of the processing performed by the CPU 1701. Further, the outputting unit 1705 is constituted, for example, by a display device (e.g., a liquid crystal display device) that can display processing results.

The external storage device 1706 is an information mass-storage device, which is represented by a hard disk drive. The external storage device 1706 stores an operating system (OS) and a computer program that enables the CPU 1701 to realize functions of respective constituent components illustrated in FIG. 4, FIG. 5, FIG. 14, and FIG. 15. Further, the external storage device 1706 can store each image serving as a processing target.

The computer program and the data stored in the external storage device 1706 can be appropriately loaded into the RAM 1702 and executed or processed by the CPU 1701. A network (e.g., a local area network (LAN) or the internet) or another device (e.g., a projection apparatus or a display apparatus) can be connected to the I/F 1707. The computer can acquire and output various information via the I/F 1707. A bus 1708 connects the above-mentioned constituent components.

The CPU 1701 performs control processing to realize above-mentioned operations described with reference to the flowcharts.

Additional embodiments can also be realized by a computer of a system or apparatus that reads out and executes computer executable instructions recorded on a storage medium (e.g., computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The image processing apparatus according to the present invention writes the updated context parameter into the context memory corresponding to each entropy coding unit and into the shared context memory until it completes the coding processing for M blocks positioned on the left side of a slice. Therefore, the shared context memory can prepare the context parameter required to perform coding processing for a block positioned on the left side of the lower block line at the completion timing of the coding processing performed for M blocks positioned on the left side of the slice. Accordingly, the image processing apparatus according to the present invention can speedily complete the coding processing because it is unnecessary to copy the context parameter to a context memory corresponding to the lower block line.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and function.

This application claims the benefit of Japanese Patent Application No. 2012-248312 filed Nov. 12, 2012, which is hereby incorporated by reference herein in its entirety.

What is claimed is:

1. An image coding apparatus, comprising:
a plurality of predictive coding units configured to predictively encode inputted image data;
a plurality of entropy coding units configured to execute processing of both entropy encoding the image data predictively-coded by the predictive coding units on the basis of context parameters and updating the context parameters on the basis of a result of the entropy coding;
a plurality of context memories configured to store context parameters that are to be used by the entropy coding units;
a common context memory for storing the context parameters that are to be used in common by at least two among the plurality of entropy coding units; and
a memory control unit configured to write the context parameters to the context memories and the common context memory,
wherein, at a first timing before a second entropy coding unit executes the processing for a left end block in a second block line subsequent to a first block line, in response to execution of the processing for a block in the first block line by a first entropy coding unit, the memory control unit writes context parameters based on the result of the entropy coding in the first entropy coding unit both to a first context memory which stores context parameters that are to be used by the first entropy coding unit, and to the common context memory;
wherein, at a second timing after the first timing before the second entropy coding unit executes the processing for the left end block in the second block line, the memory control unit writes the context parameters based on the result of the entropy coding in the first entropy coding unit in the common context memory to a second context memory which stores context parameters that are to be used by the second entropy coding unit.

2. An image coding apparatus comprising:
a plurality of predictive coding units configured to predictively encode inputted image data;
a plurality of entropy coding units configured to execute processing of both entropy encoding the image data predictively-coded by the predictive coding units on the basis of context parameters on a block-by-block basis and updating the context parameters on the basis of a result of the entropy coding;
a first context memory group including a plurality of context memories and a second context memory group including a plurality of context memories, to store context parameters to be used by the plurality of entropy coding units;
a common context memory for storing the context parameters that are to be used in common by at least two among the plurality of entropy coding units; and
a memory control unit configured to write the context parameters to the context memories and the common context memory,
wherein the memory control unit is configured to initialize at least one of the first context memory group and the second context memory that is first used by the entropy coding unit, together with the common context memory, before starting coding processing for the image data, at predetermined timing in response to execution of the processing for the block by entropy coding unit, write the same context parameter into a context memory corresponding to the entropy coding unit, a context memory corresponding to a subsequent block line which is a context memory belonging to the context memory group to which the context memory belongs, and the common context memory, until the entropy coding unit completes the processing for a predetermined number of blocks positioned on the left side of each block line, and write the context parameter stored in the common context memory into the first or second context memory group, into which nothing is written in the writing processing, in response to a completion of processing for writing the context parameter corresponding to the block into the common context memory.

3. A method for controlling an image coding apparatus, comprising:
a plurality of predictive coding processes for predictively encoding inputted image data;
a plurality of entropy coding processes for executing processing of both entropy encoding the predictively-coded image data on the basis of context parameters, and updating the context parameters on the basis of a result of the entropy coding; and
a memory control process for writing to a plurality of context memories configured to store context parameters that are to be used in the entropy coding processes, and for writing to a common context memory configured to be used in common by at least two among the plurality of entropy coding processes,
wherein, at a first timing before a second entropy coding process executes the processing for a left end block in a second block line subsequent to a first block line, in response to execution of the processing for a block in the first block line by a first entropy coding process, the memory control process writes context parameters based on the result of the entropy coding in the first entropy coding process both to a first context memory which stores context parameters that are to be used by the first entropy coding process, and to the common context memory;
wherein, at a second timing after the first timing before the second entropy coding process executes the processing for the left end block in the second block line, the memory control process writes the context parameters based on the result of the entropy coding in the first entropy coding process in the common context memory to a second context memory, which stores context parameters that are to be used by the second entropy coding process.

4. A non-transitory computer-readable storage medium storing computer-executable instructions for carrying out the method of claim 3.

5. A method for controlling an image coding apparatus, comprising:
a plurality of predictive coding processes for predictively encoding inputted image data;
a plurality of entropy coding processes for executing processing of both entropy encoding the predictively-coded image data on the basis of context parameters on a block-by-block basis, and updating the context parameters on the basis of a result of the entropy coding; and
a memory control process for writing to a first context memory group and a second context memory group including a plurality of context memories configured to store context parameters that are to be used in the entropy coding processes, and for writing to a common context memory configured to be used in common by at least two among the plurality of entropy coding processes, wherein the memory control unit is configured to initialize at least one of the first context memory group and the second context memory that is first used by the entropy coding process, together with the common context memory, before starting coding processing for the image data, at predetermined timing in response to execution of the processing for the block by entropy coding process, write the same context parameter into a context memory corresponding to the entropy coding process, a context memory corresponding to a subsequent block line which is a context memory belonging to the context memory group to which the context memory belongs, and the common context memory, until the entropy coding process completes the processing for a predetermined number of blocks positioned on the left side of each block line, and write the context parameter stored in the common context memory into the first or second context memory group, into which nothing is written in the writing processing, in response to a completion of processing for writing the context parameter corresponding to the block into the common context memory.

6. A non-transitory computer-readable storage medium storing computer-executable instructions for carrying out a method, the method comprising:

a plurality of predictive coding processes for predictively encoding inputted image data;

a plurality of entropy coding processes for executing processing of both entropy encoding the predictively-coded image data on the basis of context parameters on a block-by-block basis, and updating the context parameters on the basis of a result of the entropy coding; and a memory control process for writing to a first context memory group and a second context memory group including a plurality of context memories configured to store context parameters that are to be used in the entropy coding processes, and for writing to a common context memory configured to be used in common by at least two among the plurality of entropy coding processes, wherein the memory control unit is configured to initialize at least one of the first context memory group and the second context memory that is first used by the entropy coding process, together with the common context memory, before starting coding processing for the image data, at predetermined timing in response to execution of the processing for the block by entropy coding process, write the same context parameter into a context memory corresponding to the entropy coding process, a context memory corresponding to a subsequent block line which is a context memory belonging to the context memory group to which the context memory belongs, and the common context memory, until the entropy coding process completes the processing for a predetermined number of blocks positioned on the left side of each block line, and write the context parameter stored in the common context memory into the first or second context memory group, into which nothing is written in the writing processing, in response to a completion of processing for writing the context parameter corresponding to the block into the common context memory.

7. The image coding apparatus according to claim 1, wherein, during a predetermined period of time after the first timing, in response to execution of the processing for the block by the first entropy coding unit, the memory control unit writes the context parameters based on the result of the entropy coding in the first entropy coding unit to the first context memory, but not to the common context memory.

8. The image coding apparatus according to claim 1, wherein, before the first entropy coding unit executes the processing for a left end block in a first block line, the first context memory corresponding to the first entropy coding unit and the common context memory are initialized.

9. The image coding apparatus according to claim 1, wherein the first timing is timing of completion of the processing for a predetermined number of blocks by the first entropy coding unit; and wherein, until the first timing, in response to execution of the processing for the block by the first entropy coding unit, the memory control unit writes the context parameters based on the result of the entropy coding in the first entropy coding unit both to the first context memory and to the common context memory.

10. The image coding apparatus according to claim 1, wherein a third entropy coding unit for processing a third block line which is a block line beneath the second block line, executes the processing for a left end block in the third block line after execution of the processing for the left end block in the second block line by the second entropy coding unit;

wherein, at a third timing before the third entropy coding unit executes the processing for the left end block in the second block line, in response to execution of the processing for the block by the second entropy coding unit, the memory control unit writes context parameters based on the result of the entropy coding in the second entropy coding unit both to the second context memory and to the common context memory; and wherein, at a fourth timing after the third timing before the third entropy coding unit executes the processing for the left end block in the third block line, the memory control unit writes the context parameters based on the result of the entropy coding in the second entropy coding unit in the common context memory to a third context memory which stores context parameters that are to be used by the third entropy coding unit.

* * * * *